United States Patent
Rethore

[11] 4,099,851
[45] Jul. 11, 1978

[54] READING AID
[76] Inventor: Gerard Rethore, 22, rue Garibaldi, 34 Meze, France
[21] Appl. No.: 684,011
[22] Filed: May 7, 1976
[51] Int. Cl.² .............................................. G02B 7/02
[52] U.S. Cl. .................................... 350/246; 350/247; 350/287; 350/237
[58] Field of Search ................... 350/48, 49, 190, 246, 350/235, 247, 237, 240, 241, 244, 245, 286, 287

[56] References Cited
U.S. PATENT DOCUMENTS
2,453,064  11/1948  Cressaty ........................... 350/237 X

FOREIGN PATENT DOCUMENTS
2,271,591  12/1975  France ................................. 350/237

Primary Examiner—F. L. Evans
Attorney, Agent, or Firm—Karl F. Ross

[57] ABSTRACT

A device designed to help persons of impaired vision to read written or printed texts on a horizontal surface comprises an elongate lens mount with a base having a bottom slot which extends in reading direction to encompass one or more lines of text. The top of the lens mount holds a positively refracting, preferably bidimensionally (i.e. spherically) effective, eyepiece of elongate outline paralleling the bottom slot, its longitudinal plane of symmetry including an acute angle with the vertical. Another optical component disposed below the eyepiece in the lens mount, such as a prism or a cylindrical objective, refracts light rays from the slot toward the transversely offset eyepiece whose flat or slightly curved underside defines with that other component an air space narrowing in the direction of refraction. The base of the lens mount may be longitudinally slidable in a holder placed on the paper to be read.

9 Claims, 7 Drawing Figures

READING AID

FIELD OF THE INVENTION

My present invention relates to a reading aid for persons of impaired vision.

BACKGROUND OF THE INVENTION

The usual magnifying glasses designed to assist visually handicapped persons in the reading of written or printed texts comprise a unitary or cemented lens member of positive refractivity, or possibly several such lens members coaxially disposed with intervening air spaces, which must be held at a certain distance from the eye and from the text to be read. Since the eye has to be substantially in line with the optical axis, which in turn should be more or less perpendicular to the paper or other surface bearing the text, the reader normally will have to hold the magnifying glass in one hand while using the other hand for keeping the paper at a suitable inclination to the horizontal; otherwise, i.e. if the reader has only one hand free and if no inclined support for the paper is available, he will have to bend over the desk or table on which the paper is horizontally positioned. Both modes of use are inconvenient, especially for elderly persons for whom such reading aids are primarily designed.

Cylindrical magnifying lenses are also known which can be placed directly on the paper so as to overlie one or more lines of the text to be read. These devices, however, do not magnify in the longitudinal direction of the lines and generally have only a low magnification factor in the transverse direction.

OBJECTS OF THE INVENTION

The general object of my present invention, therefore, is to provide an improved reading aid which obviates the aforestated drawbacks.

A more particular object is to provide a device of this nature which need not be lifted by the user and allows him to assume his natural sitting position while reading a text placed before him on a table or other horizontal surface.

SUMMARY OF THE INVENTION

A reading aid according to my present invention comprises an elongate lens mount with a base positionable on a horizontal text carrier, as for example a newspaper, this base having a bottom slot adapted to register with at least part of a line of the text. The lens mount contains a plurality of optical components of elongate outline generally paralleling the bottom slot, these components including a positively refracting eyepiece remote from that slot whose longitudinal plane of symmetry is inclined at an acute angle, e.g. between about 30° and 60°, to a vertical plane longitudinally bisecting the slot. Another component, disposed between the slot and the eyepiece, has a substantially constant cross-section shaped to refract vertical light rays from a centerline of the slot toward the inclined longitudinal plane of symmetry of the eyepiece. This latter component can be either an inclined cylindrical lens member or a prism and could lie between the eyepiece and a further component serving as an objective.

Thus, the elongate optical components within the lens mount may include a bottom member magnifying only in the transverse direction. In combination with a bidimensionally effective eyepiece, namely a lens member with a spherical, spheroidal or parabolic upper surface, such a cylindrical objective will produce an anamorphotic effect with larger amplification in the transverse than in the longitudinal direction. A similar effect can be had by providing the lens member of the eyepiece with a slightly concave lower surface curved about an axis which is generally transverse to its inclined longitudinal plane of symmetry. On the other hand, the anamorphosis could be reduced or eliminated by making the bottom surface of the eyepiece cylindrically convex instead of concave.

If a prism is used as an intermediate optical component, the objective may be curved according to a figure of revolution so as to have a bidimensional positive refractivity similar to that of the eyepiece.

In all instances, the center of the eyepiece should be transversely offset from that of the slot -- in the direction of refraction of the light rays the prism or by the objective -- so as to insure a full illumination of the eyepiece by the light traversing the bottom slot. The length of the lens mount and its optical components should be sufficient to enable binocular viewing of the characters to be read.

BRIEF DESCRIPTION OF THE DRAWING

The above and other features of my invention will now be described in detail with reference to the accompanying drawing in which.

SPECIAL DESCRIPTION

Figure 5:
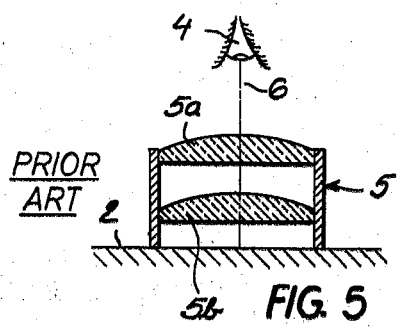
FIG. 5 is a sectional elevational view of a conventional magnifying glass.

Reference will first be made to FIG. 5 showing a conventional reading aid 5 with two spaced-apart planoconvex lenses 5a, 5b whose axis 6 is perpendicular to a surface 2 carrying the text to be read. As will be apparent, the eye 4 of the reader must be substantially in line with that axis so that, if surface 2 is horizontal as shown, the reader must bend over it in an uncomfortable position. Also, the device becomes very unhandy if the lens diameter is to be a major fraction of a line of text printed on standard-size paper.

Figure 1:
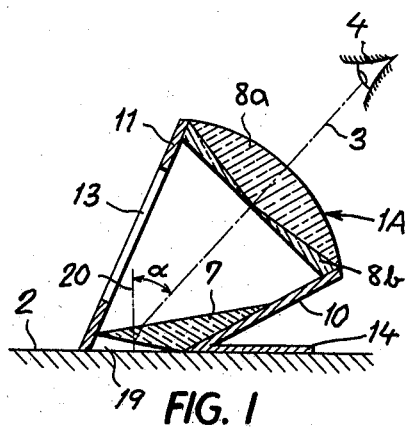
FIG. 1 is a somewhat diagrammatic view, in cross-sectional elevation, of a reading aid according to my invention.
Figure 6:
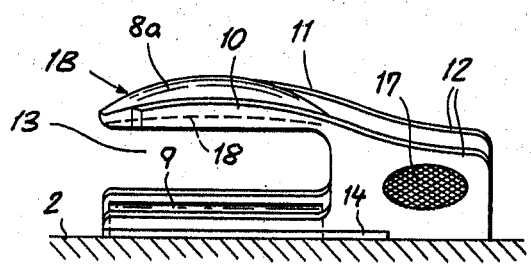
FIG. 6 is a side-elevational view of the device shown in FIG. 2.
Figure 7:
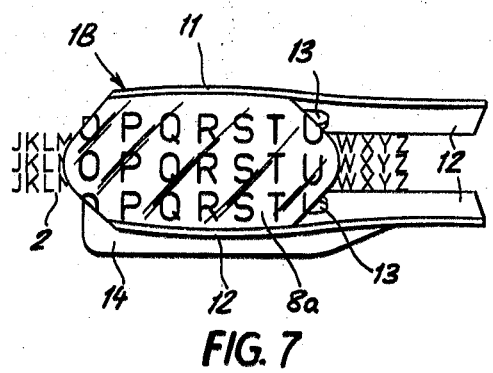
FIG. 7 is a top view of the same device.

In FIG. 1 I have shown an embodiment of my improved reading aid in the form of a device 1A which comprises a lens mount in the form of an upwardly diverging, open-bottomed casing having longitudinal sidewalls 10 and 11. As ilustrated in FIGS. 6 and 7, these sidewalls may be extended into a pair of handles 12 with rubber patches 17 designed to facilitate their gripping by the fingers of the user. Either or both sidewalls may be formed with a window 13 to admit ambient light; the windows, as shown in FIG. 6, may be open-ended cutouts. Such windows will not be required if the walls 10 and 11 (or at least one of them) are made of transparent or translucent material; alternatively, in the case of a windowless opaque lens mount, a nonillustrated lamp may be installed in its interior.

The base of the lens mount 10, 11 is provided with a foot 14 stabilizing its position on the surface 2, that surface carrying lines of text parallel to the major dimension of the lens mount. The device of FIG. 1 comprises two optical components in that lens mount, i.e. a prism 7 proximal to a bottom slot 19 of the mount and an eyepiece composed of a pair of lenses 8a, 8b cemented to each other. The compound lens member 8a, 8b is of positive bidimensional refractivity with a planar lower surface and a spherically or aspherically curved upper surface centered on an axis; it has, however, an oblong outline with a major dimension parallel to that of the lens mount and of its bottom slot 19.

Light rays reflected vertically upwardly by the surface 2 along the centerline of slot 19, as indicated at 20, are refracted by the prism 7 which they leave with an acute angle of inclination α to the vertical. The refracted light rays coincide with a longitudinal plane of symmetry 3 of eyepiece 8a, 8b containing the optical axis thereof. Thus, the eye 4 of the user need no longer observe the magnified text from above, as with the prior-art device 5 of FIG. 5; instead, the text can be read from a convenient angle of observation, e.g. of about 45°.

Figure 2:
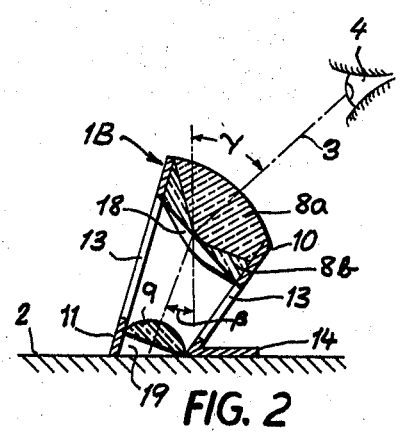

In FIG. 2 I have shown a modified reading aid 1B according to my invention wherein the prism 7 has been replaced by a cylindrical lens 9 of unidimensional positive refractivity, this lens having a planar lower surface inclined at an angle β to the horizontal. Angle β, which is less than the angle of inclination γ of the optical axis of eyepiece 8a, 8b to the vertical, should be small enough to prevent a significant distortion of the text to be read. Cylindrical lens 9, like prism 7, has a constant cross-section so as to be uniformly effective over the entire length of bottom slot 19.

In FIGS. 2 and 6 the underside of eyepiece 8a, 8b, i.e. the lower surface 18 of its dispersive low-power constituent, has been shown slightly concave with a cylindrical curvature centered on an axis which is approximately perpendicular to the longitudinal plane of symmetry 3. Such a curvature, which somewhat compresses the field of view in the longitudinal direction, may also be provided in the other embodiments.

Figure 3:
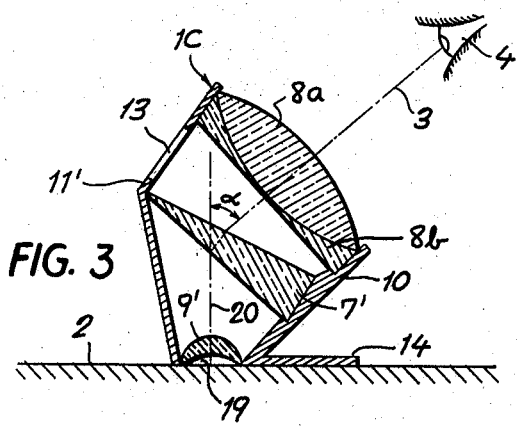

The modification of FIG. 3 comprises a device 1C which combines a cylindrical objective 9' with a compound spherical or aspherical eyepiece 8a, 8b centered on an inclined axis, as in the preceding embodiments, with interposition of a prism 7' between these two components. Unlike lens 9, lens 9' is horizontally positioned so that its longitudinal plane of symmetry coincides with the bisector 20 of the bottom slot 19. This lens, furthermore, has a slightly concave lower surface giving it a meniscus-shaped cross-section which could also be used in the corresponding lens of FIG. 2.

Figure 4:
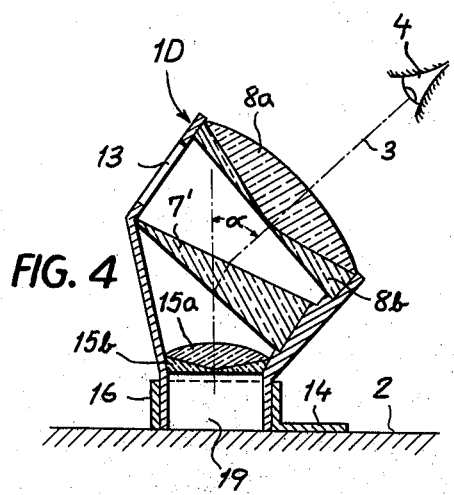
FIGS. 2, 3 and 4 are views similar to FIG. 1, illustrating other embodiments.

In FIG. 4 the objective of a reading aid 1D is formed by two spherically or aspherically curved lenses 15a, 15b centered on a vertical axis, this lens member being thus optically similar to the eyepiece 8a, 8b with which it forms an optical system comparable to that of a microscope. Again, a prism 7' is interposed between the two other components. This arrangement is optically more precise than the preceding three embodiments.

In FIG. 4 I have also illustrated the possibility of providing a frame 16 in which the base of the lens mount, forming the bottom slot 19, is longitudinally slidable across the entire width of the text to be read. The foot 14 is here an integral part of the frame rather than of the lens mount. Naturally, such a guide frame could also be provided with any of the other embodiments.

The lens mount of any embodiment may be internally provided with adjustable seats for its components, as is well known per se, for varying the distance of the eyepiece and/or the objective from the text-carrying surface.

It will be noted that, in all disclosed embodiments, the lower surface of the eyepiece defines with the underlying lens or prism an air space which narrows in the aforementioned direction of refraction (i.e. toward the right as viewed in FIGS. 1–4) and registers at its wider side with the window 13 of the lens mount.

I claim:

1. A reading aid for persons of impaired vision, comprising:
    an elongate lens mount with a base positionable on a horizontal surface carrying a text to be read, said base having a bottom slot adapted to register with at least part of a line of said text; and
    a plurality of optical components of elongate outline generally paralleling said slot in said lens mount, said components including a positively refracting eyepiece remote from said slot having a longitudinal plane of symmetry inclined at an acute angle to a vertical plane longitudinally bisecting said slot, another of said components lying between said slot and said eyepiece to refract vertical light rays from a centerline of said slot toward said inclined longitudinal plane, said eyepiece having a center transversely offset from the centerline of said slot in the direction of refraction of said vertical light rays by said other of said components.

2. A reading aid as defined in claim 1 wherein said other of said components is a prism.

3. A reading aid as defined in claim 2 wherein said components further include a positively refracting lens member in the vicinity of said slot separated by said prism from said eyepiece.

4. A reading aid as defined in claim 1 wherein said other of said components is a positive lens member proximal to said slot.

5. A reading aid as defined in claim 4 wherein said lens member has a cylindrically convex upper surface and a substantially flat lower surface, the latter surface being inclined to the horizontal at an angle less than the angle of inclination of said longitudinal plane of symmetry to the vertical.

6. A reading aid as defined in claim 1 wherein said eyepiece is a bidimensionally effective lens member with a convex upper surface and with a substantially flat lower surface inclined at said acute angle, said lower surface defining with said other of said components an air space narrowing in said direction of refraction.

7. A reading aid as defined in claim 6 wherein said lower surface has a slight cylindrically concave curvature centered on an axis generally transverse to said inclined longitudinal plane.

8. A reading aid as defined in claim 6 wherein said lens mount is a housing with a pair of longitudinal sidewalls flanking said components, at least one of said sidewalls having a portion inclined to the vertical in said direction of refraction and provided with a window at a location between said eyepiece and said other of said components, said window opening into said air space on the wider side thereof.

9. A reading aid as defined in claim 1, further comprising a frame adapted to rest on said horizontal surface, said lens mount being longitudinally slidable in said frame and being provided with a handle-forming extension for manual displacement relative to said frame.

* * * * *